United States Patent [19]
Miyazaki et al.

[11] Patent Number: 4,819,220
[45] Date of Patent: Apr. 4, 1989

[54] OPTICAL INFORMATION RECORDING AND REPRODUCING APPARATUS

[75] Inventors: Tasuhiro Miyazaki, Koganei; Hiroo Okada, Hachioji; Toshio Tsurukawa, Machida; Shohei Kobayashi, Hachioji, all of Japan

[73] Assignee: Olympus Optical Co., Ltd., Tokyo, Japan

[21] Appl. No.: 95,200

[22] Filed: Sep. 11, 1987

[30] Foreign Application Priority Data

Sep. 12, 1986 [JP] Japan .................. 61-216819
Jun. 11, 1987 [JP] Japan .................. 62-145527

[51] Int. Cl.⁴ .................. G11B 7/00; G11B 15/52
[52] U.S. Cl. .................. 369/45; 369/50
[58] Field of Search .................. 369/45, 46, 47, 50

[56] References Cited

U.S. PATENT DOCUMENTS

| | | | |
|---|---|---|---|
| 4,243,850 | 1/1981 | Edwards | 369/46 |
| 4,417,330 | 11/1983 | Hazel et al. | 369/45 X |
| 4,544,872 | 10/1985 | Hirano et al. | 369/46 X |
| 4,561,081 | 12/1985 | Janssen et al. | 369/46 X |
| 4,562,565 | 12/1985 | Tamura | 369/46 X |
| 4,611,317 | 9/1986 | Takeuchi et al. | 369/45 |
| 4,628,497 | 12/1986 | Bierhoff | 369/44 |

FOREIGN PATENT DOCUMENTS

0127845 12/1984 European Pat. Off. .
3132818 4/1982 Fed. Rep. of Germany .
3438252 5/1985 Fed. Rep. of Germany .

*Primary Examiner*—William L. Sikes
*Assistant Examiner*—Akm E. Ullah
*Attorney, Agent, or Firm*—Armstrong, Nikaido, Marmelstein & Kubovcik

[57] ABSTRACT

A means receiving a light returning from an optical recording medium and detecting the beam distribution in the tangential direction of the track of the recording medium is provided. The offset of at least one controlling signal of a focusing controlling signal and tracking controlling signal is eliminated by the output signal of this beam distribution detecting means.

14 Claims, 11 Drawing Sheets

FIG. 1 (PRIOR ART)
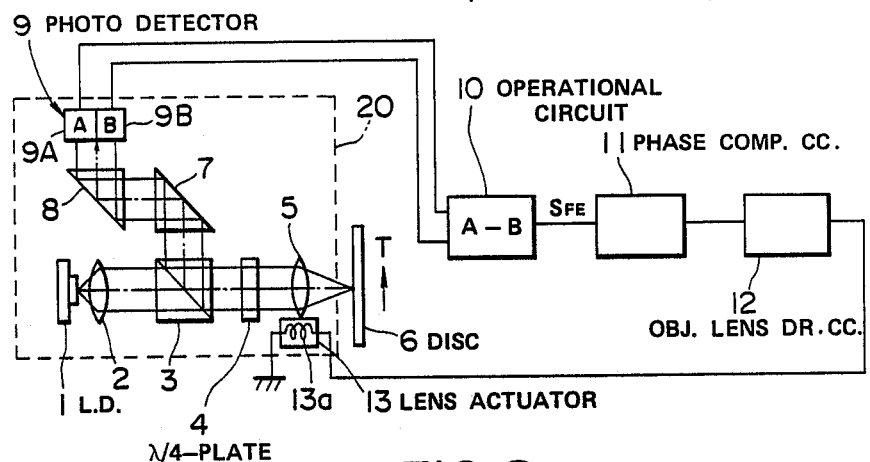
FIG. 2 (RELATED ART)
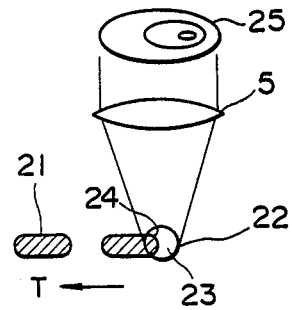
(RELATED ART)
FIG. 3a  RECORD -COMMAND -PULSE
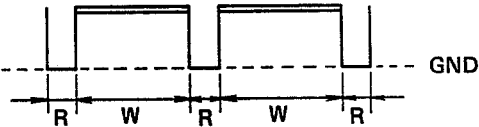
FIG. 3b  FOCUS ERROR SIG. $S_{FE}$
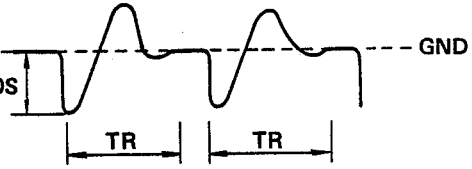

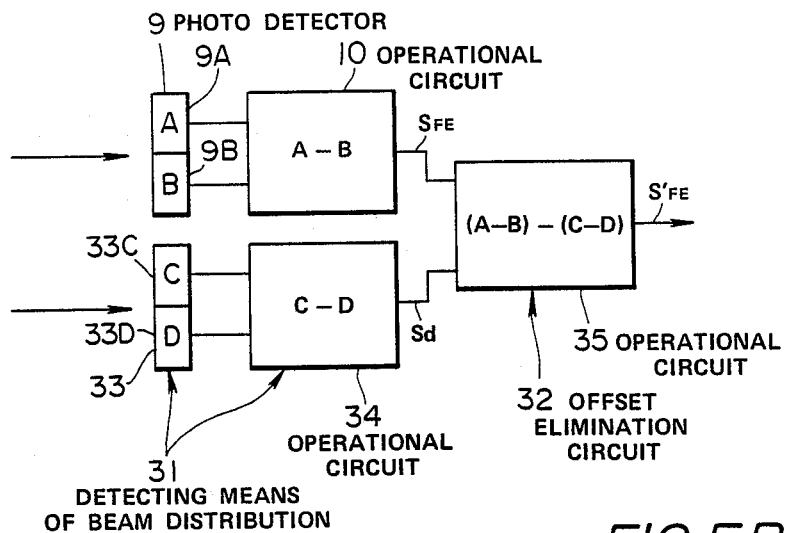
FIG.4
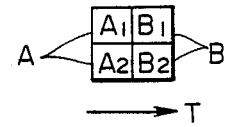
FIG.5B
FIG.5A
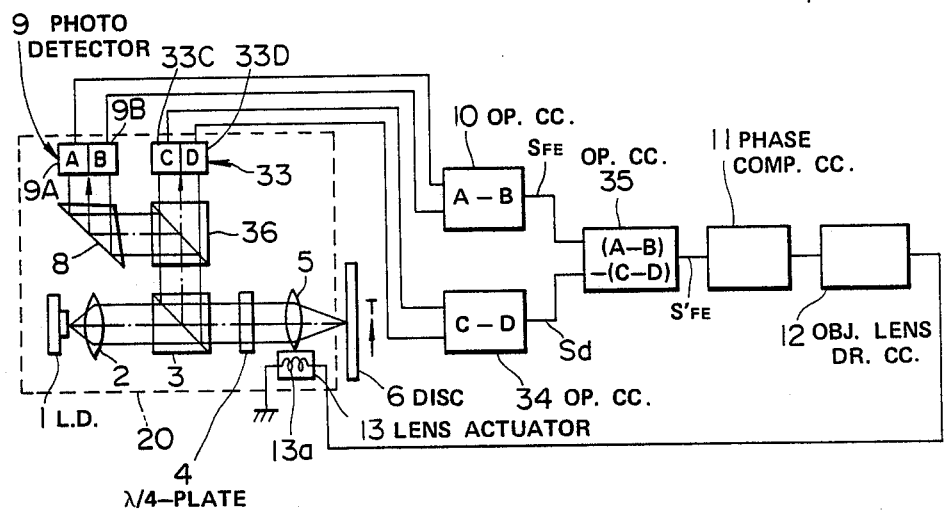

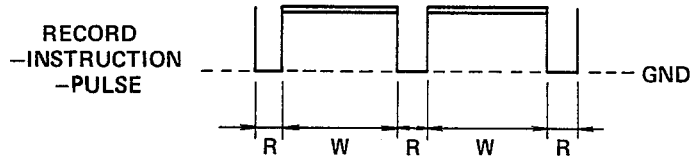
FIG.6a  RECORD
-INSTRUCTION
-PULSE
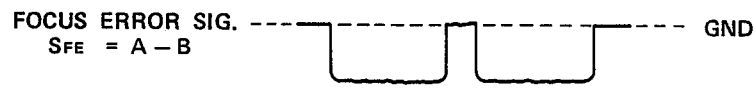
FIG.6b  FOCUS ERROR SIG.
$S_{FE} = A - B$
FIG.6c  SIGNAL OF
BEAM DISTRIBUTION
$S_d = C - D$
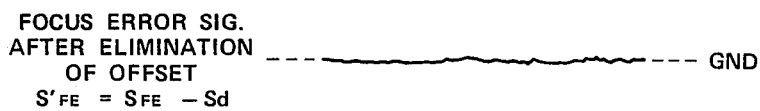
FIG.6d  FOCUS ERROR SIG.
AFTER ELIMINATION
OF OFFSET
$S'_{FE} = S_{FE} - S_d$

STATE 1 (TOO FAR)

STATE 2 (TOO FAR)

STATE 3 (IN FOCUS)

FIG. 15a FOCUS ERROR SIG.

FIG. 15b FES LVH

FIG. 15c TOO FAR

FIG. 15d FES LVL

FIG. 15e F SRV ON

FIG. 15f DRIVING SIG.

FIG. 15g AFS ON

FIG. 15h SRCH ON

FIG. 15i DC ADD

OPTICAL INFORMATION RECORDING AND REPRODUCING APPARATUS

BACKGROUND OF THE INVENTION:

Field of the Invention and Related Art Statement

This invention relates to an optical information recording and reproducing apparatus wherein the offset of such displaced infromation signal as focusing error signal or tracking error signal in recording can be eliminated.

Recently, there has come to be noted an optical information recording and reproducing apparatus wherein, by condensing a light beam and radiating it onto an optical recording medium, the information can be recorded at a high density in this recording medium and, by receiving the light returning from this recording medium with a light detector, the recorded information written in the recording medium can be read out (reproduced) at a high speed.

In the above mentioned apparatus, as the recording or reproduction is made at a high density, the light beam condensed and radiated onto the recording medium must be held in a focused state and on-track state. Therefore, the above mentioned apparatus is usually provided with a focusing controlling means and tracking (radial) controlling means. By these controlling means, the focusing and radial displaced informations included in the light returning from the above mentioned recording medium are detected as a focusing error signal and tracking error signal and the light beam is held in a focused state and on-track state on the basis of these error signals.

Various systems for detecting the above mentioned focusing error signal and tracking error signal have been suggested. A prior art example of an optical information recording and reproducing apparatus wherein a critical angle method is used for a focusing error signal detecting system is shown in FIG. 1.

As shown in this drawing, the optical information recording and reproducing apparatus is provided with an optical pickup 20 arranged as opposed to the surface of a disc-like recording medium (which shall be mentioned as a disc hereinafter) 6. This optical pickup 20 can be moved by a moving means not illustrated in a direction crossing a recording track in the above mentioned disc 6 rotated and driven, for example, in the direction indicated by the arrow T.

A laser diode 1 as a light source is contained within a housing of the above mentioned optical pickup 20. A diffused light, for example, of a P-polarization emitted from this laser diode 1 is made of a parallel light bundle by a coupling lens 2. This parallel light bundle is incident upon a polarized beam splitter 3, is passed substantially by 100%, is circularly polarized by a λ/4 plate 4 and is then condensed and radiated onto the above mentioned disc by an objective lens 5. The light bundle condensed and radiated onto this disc 6 is radiated in a spot-like nearly focused state onto a recording layer of this disc 6. The reflected light from the recording layer of this disc 6 is condensed to be a substantially parallel light bundle by the above mentioned objective lens 5, is made an S-polarization of a polarizing direction different by 90 degrees from that in the going path by the above mentioned λ/4 plate 4 and is incident upon the above mentioned polarized light bundle splitter 3. The reflected light from this disc 6 is reflected substantially by 100% by the above mentioned polarized beam splitter 3, is further reflected by a reflecting prism 7 and is incident upon a critical angle prism 8. The light bundle reflected by the slope of this critical angle prism 8 is received by a light detector 9 provided in the position of receiving a diffracted light of a far field. This light detector 9 is formed of such light receiving device as, for example, a 4-divided photodiode. A difference signal A−B is obtained by such operational circuit 10 as a differential amplifier from the respective outputs A and B of light receiving devices 9A and 9B adjacent to each other in the horizontal direction in FIG. 1. A focusing error signal $S_{FE}$ is produced by this difference signal A−B. On the other hand, a tracking error signal is produced by the difference signal between the light receiving devices adjacent to each other in the direction vertical to the paper surface of FIG. 1.

The above mentioned focusing error signal $S_{FE}$ is applied to a focusing coil 13a of a lens actuator 13 through a phase compensating circuit 11 and objective lens driving circuit 12. The above mentioned objective lens 5 is moved in the direction vertical to the disc 6 surface by the above mentioned lens actuator 13 on the basis of the above mentioned focusing error signal $S_{FE}$ so that the focusing may be controlled.

Also, the above mentioned tracking error signal is applied to a tracking coil not illustrated of the above mentioned lens actuator 13 through a phase compensating circuit and objective lens driving circuit not illustrated so that the spot light condensed and radiated by the objective lens 5 may follow a predetermined track.

Also, a data signal is obtained from the sum signal of all the light receiving devices of the above light detector 9.

Now, in the apparatus wherein the information is recorded or reproduced by such structure variation and pits as vary the reflection rate in the recording medium as a recording form, the above mentioned focusing error signal $S_{FE}$ will offset in some case. The displacement of the optical pickup 21 forming member of the light detector 9 or the like or the offset or the like caused in the signal processing circuit of the focusing error signal $S_{FE}$ is considered for this cause. If the displacement and offset of the signal processing circuit are adjusted so as to be eliminated at the time of the reproduction, the offset at the time of the recording will be able to be dissolved.

As different from this offset, there is an offset not produced at the time of the reproduction but produced at the recording time.

That is to say, at the time of the recording, in response to the recorded data, the light beam will be set at a light emitting power high in the energy density in the pulses. Pits 21 or the like will be formed as shown in FIG. 2 in the land part of the recording medium onto which the light beam is condensed and radiated with this light emitting power. These pits 21 will not be produced uniformly for the entire beam spot 22 scanned at a high speed on the recording medium but will be produced earlier in the part of a larger radiating energy. Therefore, as shown in FIG. 2, an unrecorded part 23 and recorded part 24 will exist simultaneously in the rotating direction (direction tangential to the track) indicated by the arrow T within the beam spot 22 on the recording medium. Therefore, as a result of the diffraction effect by the reflection rate difference and phase difference between the above mentioned unrecorded part 23 and recorded part 24, the beam distribution in the tangential direction T of the far field pattern 25 of the reflected light from the above mentioned recording medium will become non-uniform. As a result, an offset will be produced in the above mentioned focusing error signal $S_{FE}$ between the reproducing section and recording section. The manner of the variation of this focusing error signal $S_{FE}$ is shown in FIG. 3.

The optical adjustment is so made that the offset may be 0 at the time of the reproduction and the reproducing state R and recording state W are changed over to each other according to such recording instructing pulses as are shown in (a). Just after the reproducing state R is changed over to the recording state W, as shown in (b), in the focusing error signal $S_{FE}$, as described above, the beam distribution in the tangential direction T of the far field pattern 25 of the reflected light from the recording medium will be non-uniform and therefore an offset OS will be produced and the focusing error signal $S_{FE}$ will gradually converge toward the ground level GND while being swung by the excess response of the servo system. By the way, in the drawing, TR represents the excess response section of the servo system. The above mentioned focusing error signal $S_{FE}$ will be greatly swung just after the reproducing state R is changed over to the recording state W but will be little swung just after the recording state W is changed over the reproducing state R, because the non-uniformity of the beam distribution in the tangential direction T of the far field pattern 25 of the above mentioned reflected light and the variation by the defocused amount of the non-uniform degree will occur only during the recording.

Thus, in the conventional optical information recording and reproducing apparatus, an offset will be produced in the focusing error signal $S_{FE}$ in the reproducing state R and recording state W and therefore it has been difficult to make the focusing control most suitable to both states.

If an offset is produced in the above mentioned focusing error signal $S_{FE}$, the light spot 22 particularly at the time of recording will expand, the radiating power will be short and the data will not be able to be written in in the normal state. Therefore, there will be produced a problem that the reliability of the optical information recording and reproducing apparatus will be reduced.

By the way, the above mentioned offset will be produced not only in the focusing error signal obtained by the critical angle method but also in the focusing error signal by another system and the tracking error signal depending on the system.

OBJECTS AND SUMMARY OF THE INVENTION

An object of the present invention is to provide an optical information recording and reproducing apparatus wherein an offset is prevented from being produced in a focusing error signal at the time of recording.

Another object of the present invention is to provide an optical information recording and reproducing apparatus wherein pulling into the focusing servo state can be positively made, writing in particularly at the time of recording can be positively made and the reliability is high.

Further other advantages and features of the present invention will become clear with the later described explanation.

In the present invention, a beam distribution detecting means 31 detecting the beam distribution in the tangential direction of a recording medium of the light returning from the above mentioned recording medium in a far field position is provided and an offset eliminating means eliminating the offset of such displaced information signal as a focusing error signal $S_{FE}$ by a beam distribution signal detected by this beam distribution detecting means 31 is provided.

BRIEF DESCRIPTION OF THE DRAWINGS

FIGS. 1 to 3 relate to a prior art example.

FIG. 1 is a formation view of an optical information recording and reproducing apparatus.

FIG. 2 is an explanatory view showing the non-uniformity of the beam distribution of a reflected light from a recording medium.

FIG. 3 (a) and (b) represent a waveform diagram for explaining an offset of a focusing error signal.

FIGS. 4 to 6 relate to the first embodiment of the present invention.

FIG. 4 is a schematic formation diagram of an essential part of the first embodiment.

FIG. 5A is a formation diagram of an optical information recording and reproducing apparatus of the first embodiment.

FIG. 5B is a formation view of a photodetector.

FIG. 6 is a waveform diagram for explaining the operation of the first embodiment.

FIG. 11 is a schematic formation view of an essential part of the fourth embodiment.

FIG. 12 is an explanatory diagram showing the formation of an optical information recording and reproducing apparatus of the fourth embodiment.

FIG. 13 is an explanatory view showing the formation of a focus searching system.

FIG. 14 is a flow chart showing the operation of the focus searching system.

DETAILED DESCRIPTION OF THE PREFERRED EMBODIMENTS OF THE INVENTION

Figure 7:
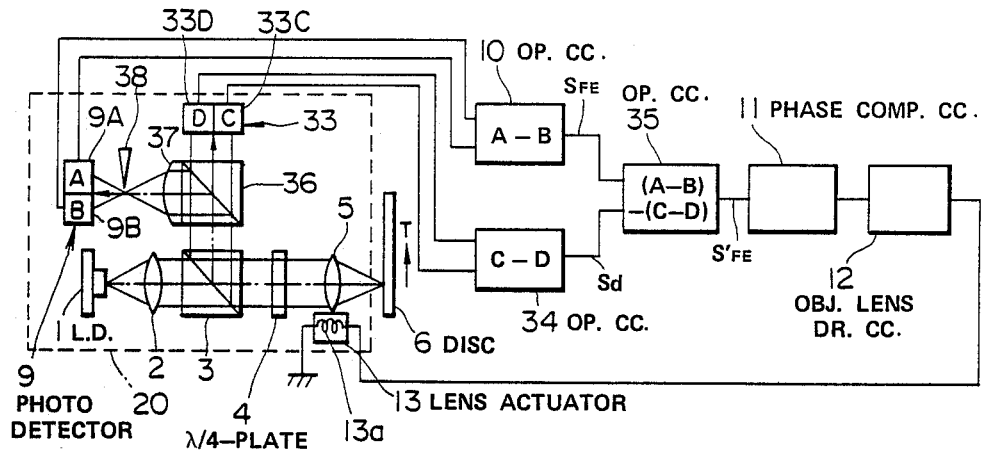
FIG. 7 is a formation diagram of an optical information recording and reproducing apparatus of the second embodiment of the present invention.

The essential part of the first embodiment of the present invention is shown in FIG. 4.

In the first embodiment, a beam distribution detecting means 31 detecting the beam distribution in the tangential direction of a recording medium of the light returning from the above mentioned recording medium in a far field position is provided and an offset eliminating means eliminating an offset of such displaced information signal as a focusing error signal $S_{FE}$ by a beam distribution signal Sd detected by this beam distribution detecting means 31 is provided.

An offset by the non-uniformity of the beam distribution in the tangential direction of the light returning from the recording medium is superposed on a difference signal A−B, that is, th focusing error signal $S_{FE}$ obtained by an operational circuit 10 from the respective outputs A and B of light receiving devices 9A and 9B, for example, of the light detector 9.

The above mentioned beam distribution detecting means 31 comprises, for example, a light detector 33 having light receiving devices 33C and 33D arranged adjacently to each other in the tangential direction in a far field position and an operational circuit operating a difference signal C−D from the respective outputs C and D of the above mentioned light receiving devices 33C and 33D and outpus the above mentioned difference signal C−D as the beam distribution signal Sd corresponding to the above mentioned offset.

The above mentioned offset eliminating means 32 comprises, for example, an operational circuit 35 operating a difference signal $S_{FE}-Sd=(A-B)-(C-D)$ between the above mentioned focusing error signal $S_{FE}$ and beam distribution signal Sd and outputs the above mentioned difference signal $S_{FE}-Sd$ as a focusing error signal $S'_{FE}$ in which the offset is eliminated.

As shown in FIG. 5, the optical information recording and reproducing apparatus of this embodiment is provided with an optical pickup 20 arranged as opposed to the surface of a disc 6. This optical pickup 20 can be moved by a moving means not illustrated in the direction crossing the recording track in the above mentioned disc 6 rotated and driven in the direction indicated, for example, by the arrow T.

A laser diode 1 as a light source is contained within the housing of the above mentioned optical pickup 20 so that the diffused light, for example, of a P-polarization emitted from this laser diode 1 may be made a parallel light bundle by a coupling lens 2. This parallel light bundle is incident upon a polarized beam splitter 3, passes through it substantially by 100%, is circularly polarized by a λ/4 plate 4 and is then condensed and radiated by an objective lens 5 onto the above mentioned disc 6. The light bundle condensed and radiated onto this disc 6 is radiated in a spot-like and nearly focused state onto a recording layer of this disc 6. When the light is emitted in the recording state, the light emitting intensity of the above mentioned laser diode will be set to be so large that the light bundle condensed and radiated onto this recording layer will form a recess or hole called a pit.

The reflected light from the recording layer of the above mentioned disc 6 is condensed by the above mentioned objective lens 5 to be a substantially parallel light bundle, is made an S-polarization of a polarizing direction different by 90 degrees from that in the going path by the above mentioned λ/4 plate 4 and is incident upon the above mentioned polarized beam splitter 3. This reflected light from the disc 6 is reflected substantially by 100% by the above mentioned polarized beam splitter 3.

In this embodiment, the light bundle reflected by the above mentioned beam splitter 3 is divided into two parts by a half prism 36. One part of the light bundle reflected by this half prism 36 is incident upon a critical angle prism 8. The light bundle reflected by the slope of this critical angle prism 8 is received by a light detector 9 arranged in the position of receiving a diffracted light of a far field. This light detector 9 is formed of such light receiving device as, for example, a four-divided photodiode. A difference signal $A-B=(A_1+A_2)-(B_1+B_2)$ is obtained by such operational circuit 10 as a differential amplifier from the respective outputs A and B of light receiving devices 9A and 9B adjacent to each other in the horizontal direction in FIG. 5. A focusing error signal $S_{FE}$ is to be produced by this difference signal A−B. By the way, a tracking error signal is to be produced by the difference signal $(A_1+B_1)-(A_2+B_2)$ between light receiving devices adjacent to each other in the direction vertical to the paper surface in FIG. 5.

The above mentioned critical angle prism 8 is so arranged as to vary the beam distribution in the tangential direction of the reflected light from the above mentioned disc 6 in response to the displacement of the focus of the light beam for the above mentioned disc 6. Therefore, the above mentioned light detector 9 is to detect the beam distribution in the tangential direction of the reflected light of the above mentioned critical angle prism by the two light receiving devices 9A and 9B. Therefore, an offset by the non-uniformity of the beam distribution in the tangential direction of the reflected light from the above mentioned disc 6 will be superposed on the above mentioned focusing error signal $S_{FE}$.

On the other hand, the other part of the light bundle having passed through the above mentioned half prism 36 is to be received by a light detector 33 arranged in the position of receiving a diffracted light of a far field. This light detector 33 is formed of such light receiving device as, for example, a two-divided or four-divided photodiode. The beam distribution in the tangential direction of the reflected light from the above mentioned disc 6 is to be detected by light receiving devices 33C and 33D arranged adjacently to each other in the tangential direction. The respective outputs C and D of the above mentioned light receiving devices 33C and 33D are to be input into an operational circuit 34 as a beam distribution detecting means. This operational circuit 34 is to operate the difference signal C−D between the respective outputs C and D of the above mentioned light receiving devices 33C and 33D and to output it as a beam distribution signal Sd.

Also, in this embodiment, an operational circuit 35 is provided as an offset eliminating means. This operational circuit 35 is to operate the difference signal $S_{FE}-Sd=(A-B)-(C-D)$ between the above mentioned focusing error signal $S_{FE}$ and beam distribution signal Sd and to output it as a focusing error signal $S'_{FE}$ having had the offset eliminated.

The above mentioned focusing error signal $S'_{FE}$ is to be applied to a focusing coil 13a of a lens actuator 13 through a phase compensating circuit 11 and objective lens driving circuit 12. The above mentioned objective lens 5 is to be moved in the direction vertical to the disc 6 surface by the above mentioned lens actuator 13 on the basis of the above mentioned focusing error signal $S'_{FE}$ to control focusing.

By the way, the tracking error signal is to be applied to a tracking coil not illustrated of the above mentioned lens actuator 13 through a phase compensating circuit and objective lens driving circuit not illustrated so that the spot light condensed and radiated by the objective lens 5 may follow a predetermined track.

Also, a data signal is to be obtained from the sum signal of all the light receiving devices of the above mentioned light detector 9.

The operation of this embodiment shall be explained in the following with reference to FIG. 6.

With the optical adjustment so made that the offset may be O at the time of the reproduction, the reproducing state R and recording state W are to changed over to each other according to such recording instruction pulse as is shown in (a). Just after the reproducing state R is changed over to the recording state W, as shown in (b), an offset will be produced from the non-uniformity of the beam distribution in the tangential direction of the reflected light from the disc 6 in the focusing error signal $S_{FE}$ obtained by the light detector 9 and operational circuit 10.

On the other hand, as shown in (c), the beam distribution signal Sd obtained by the light detector 33 and operational circuit 10 will be a signal corresponding to the beam distribution in the tangential direction of the reflected light from the disc 6.

Therefore, as shown in (d), the focusing error signal $S'_{FE}$ obtained by operating the difference singal $S_{FE} - Sd$ between the above mentioned focusing error signal $S_{FE}$ and beam distribution signal Sd by the operational circuit 35 will have the offset produced by the non-uniformity of the beam distribution in the tangential direction of the reflected light from the disc 6 eliminated.

Thus, according to this embodiment, the offset of the focusing error signal produced by the non-uniformity of the beam distribution in the tangential direction of the reflected light from the disc 6 at the time of recording can be eliminated, the respective optimum focusing points of the reproducing state R and recording state W coincide with each other and the focusing control optimum to both states can be made.

Also, between the preformat part and data part of the disc 6, as the incident beam is changed, the servo gain will be changed. However, if this servo gain is imperfectly changed, the offset of the focusing error signal will vary and the focusing error signal will be swung. According to this embodiment, as the above mentioned offset is eliminated, the swing of the focusing error signal between the preformat part and data part can be eliminated.

FIG. 7 is a formation diagram of an optical information recording and reproducing apparatus of the second embodiment of the present invention.

In this embodiment, the present invention is applied to a focusing error signal detecting system using a knife-edge method.

In this embodiment, one light bundle reflected by the half prism 36 is to be condensed by a conderser lens 37. A knife-edge (wedge-like light intersepting plate) 38 is arranged near the focus position of this condenser lens 37 and the light detector 9 is arranged in the position of receiving the diffracted light of the far field in the light bundle partly intercepted by this knife-edge 38. The difference signal A−B between the outpus A and B of the light receiving devices 9A and 9B of the above mentioned light detector 9 is operated by the operational circuit 10 and is made a focusing error signal $S_{FE}$.

The same as in the above mentioned first embodiment, the other light bundle having passed through the above mentioned half prism 36 is to be received by the light detector 33 as a beam distribution detecting means.

By the way, the light receiving devices 9A and 9B of the above mentioned light detector 9 and the light receiving devices 33A and 33B of the light detector 33 are so arranged that the polarities of the focusing error signal $S_{FE}$ and beam distribution signal Sd may coincide with each other for the beam distribution in the tangential direction of the reflected light from the disc 6.

The other formations, operations and effects are the same as in the first embodiment.

Figure 8:
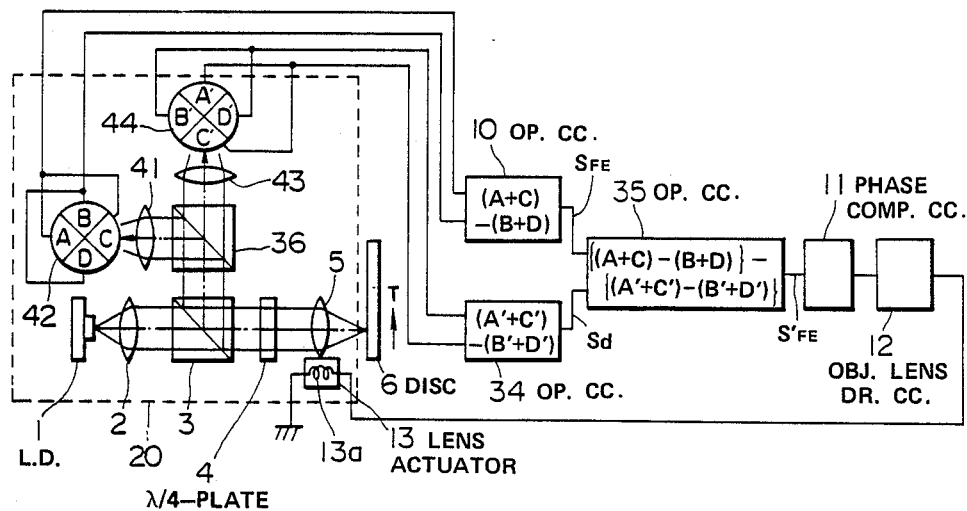
FIG. 8 is a formation diagram of an optical information recording and reproducing apparatus of the third embodiment of the present invention.

FIG. 8 is a formation view of an optical information recording and reproducing apparatus of the third embodiment of the present invention.

In this embodiment, the present invention is applied to a focusing error signal detecting system using an astignatic method.

In this embodiment, a cylindrical lens 41 is arranged in a light path of one light bundle reflected by the half prism 36. A four-divided light detector 42 is arranged in the position wherein the light bundle astignated by this cylindrical lens 41 becomes a true circle in the focused state. The focusing error signal $S_{FE}$ is obtained by taking the sums (A+C) and (B+D) of the outputs of the diagonal devices of the above mentioned light detector 42 and then operating the difference signal (A+C)−(B+D) by the operational circuit 10.

On the other hand, a cylindrical lens 43 is arragned in the light path of the other light bundle having passed through the above mentioned half prism 36. A four-divided light detector 44 is arranged in the position wherein the light bundle astignated by this cylindrical lens 43 becomes a true circle in the focused state. The beam distribution signal Sd is to be obtained by taking the sums (A'+C') and (B'+D') of the outputs of the diagonal devices of this light detector 44 and then operating the difference signal (A'+C')−(B'+D') by the operational circuit 34.

By the way, the respective light receiving devices of the above mentioned light detectors 42 and 44 are so arranged that the polarities of the focusing error signal $S_{FE}$ and beam distribution signal Sd may coincide with each other for the beam distribution in the tangential direction of the reflected light from the disc 6.

The other formations, operations and effects are the same as in the first embodiment.

By the way, the present invention is not limited to the above mentioned embodiments. For example, in the first and second embodiments, the focusing error signal $S'_{FE}$ having had the offset eliminated may be obtained by operating the difference signals (A−C) and (B−D) and then further operating their difference signal (A−C)−(B−D).

Also, a means of adjusting the gains of the focusing error signal $S_{FE}$ and beam distribution signal Sd may be provided to positively eliminate the offset.

By the way, the present invention can be applied also to the case of eliminating the offset of the focusing error signal and tracking error signal by any other system than of the above mentioned embodiments.

The above mentioned embodiments can be applied to a recording form not only forming pits but also varying the reflecting rate or passing rate by the phase dhift or the like.

Further, the above mentioned embodiments can be applied not only to the rotated driven discs but also to a card-like recording medium to have signals written in.

As explained above, according to the above mentioned first, second and third embodiments, a beam distribution detecting means detecting the beam distribution in the tangential direction of a recording medium of the light returning from the above mentioned recording medium in a far field position is provided, an offset eliminating means eliminating the offset of a displaced information signal by a beam distribution signal detected by this beam distribution detecting means is provided and therefore there is an effect that the offset of the displaced information signal at the time of recording can be eliminated.

Now, prior to the explanation of the fourth embodiment of the present invention in which the above mentioned respective embodiments are improved, the improvements shall be first explained.

For example, in the first embodiment shown in FIG. 5, the beam distribution detecting means 31 detecting the beam distribution in the tangential direction of the disc 6 of the light returning from the above mentioned disc 6 in a far field position is provided and the offset eliminating means 32 eliminating the offset of the displaced information signal of the focusing error signal $S_{FE}$ by the beam distribution signal Sd detected by this beam distribution detecting means 31 is provided. The above mentiined beam distribution detecting means 31 comprises, for example, the light detector 33 having the light receiving devices 33C and 33C arragned adjacently to each other in the tangential direction and the operational circuit 34 operating the difference signal C-D from the respective outputs C and D of the above mentioned light receiving devices 33C and 33D and outputs the above mentioned difference signal C−D as the beam distribution signal Sd. The above mentioned offset eliminating means 32 comprises the operational circuit 35 operating, for example, the difference signal $S_{FE}-Sd=(A-B)-(C-D)$ between the above mentioned focusing error signal $S_{FE}$ and beam distribution signal Sd and outputs the above mentioned difference signal $S_{FE}-Sd$ as a focusing error signal $S'_{FE}$ having had the offset eliminated.

Figure 9A:
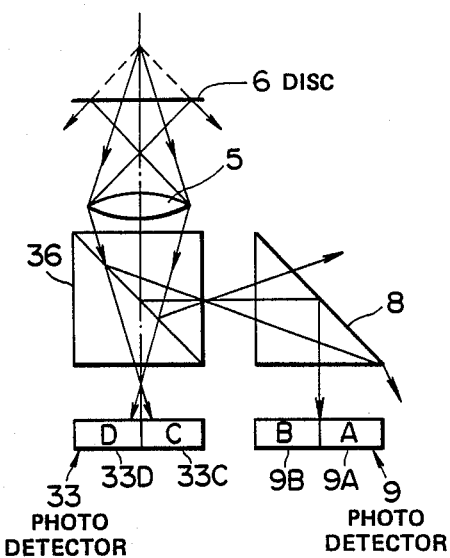
FIG. 9 is an explanatory diagram showing the variation of an offset component at the time of focus searching.
Figure 9B:
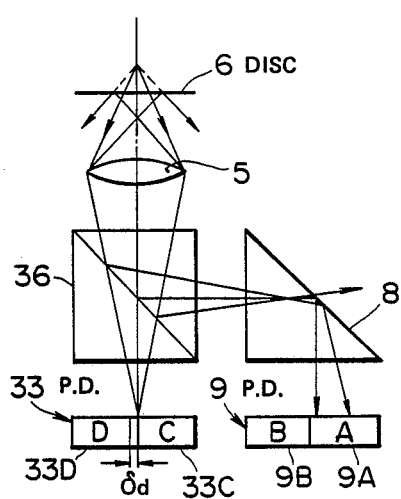

Now, a focus search leading the objective lens 5 into the pull-in range of a focus servo is carried out, for example, as shown in FIG. 9 in some case, that is to say, the objective lens 5 is made to gradually approach the disc 6 from the state 1 too far from the disc 6 as shown in (a) in the drawing to enter the servo pull-in range through such state 2 as is shown in (b) and then the servo loop is closed to keep such in-focus state 3 as is shown in (c). In the case of this focus search, the normal focusing error signal when the loop is opened will gradually increase to take the maximum value as shown in FIG. 10(a), will then decrease to take the minimum value and will then again increase to reach the in-foxus point. By the way, if the disc 6 is approached farther than this in-focus point, the above mentioned focusing error signal will further increase to take the maximum value and will then gradually descrease.

Figure 9C:
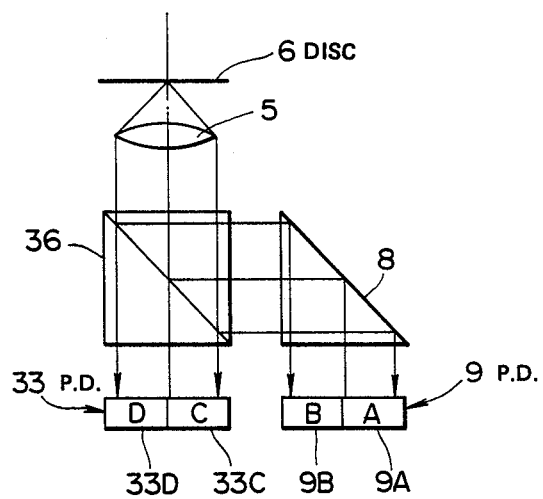
Figure 10A:
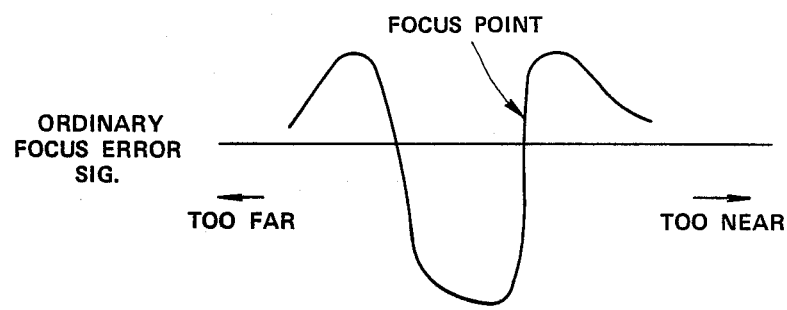
FIG. 10 is a waveform diagram showing a focusing error signal waveform at the time of focus searching.
Figure 10B:
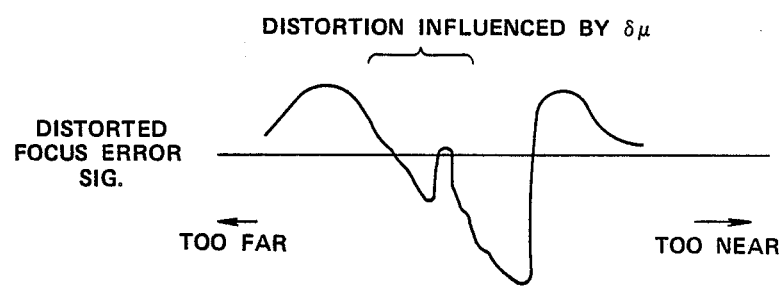

Now, the positions of the beam distribution detecting light receiving devices 33C and 33D are adjusted in the in-focus state 3 as shown in FIG. 9(c). In such case, even if there are slightly such position errors as the eccentricity and inclination of the optical system, the above mentioned light receiving devices 33C and 33D will be adjusted so that the difference signal C−D=0. However, in comparing the focus offset components $\delta n$ (n=1, 2 and 3)=$|C-D|$ in the above mentioned respective states 1, 2 and 3, it is found that, when such light returning from the disc 6 as is shown in the state 2 forms an image on the light receiving devices 33C and 33D, the difference signal $C-D=\delta 2$ between the above mentioned light receiving devices 33C and 33D will be much larger than the difference signals $\delta 1$ and $\delta 3$ in the states 1 and 3. Therefore, at this time, when the loop is opened, the focusing error signal will be distorted as shown in FIG. 10(a) under the influence of the above mentioned $\delta 2$. In case the focus servo is pulled in by judging the form of the focusing error signal when the above mentioned loop is opened, the focus servo may fail to be pulled in under the influence of this distortion. Such distortion of the focusing error signal waveform as is shown in FIG. 10(b) will be likely to be generated unless such position adjusting difference $\delta d$ between the beam distribution detecting light receiving devices 33C and 33D as is shown in FIG. 9(b) and the aberration and displacement of the other optical devices are entirely eliminated.

In and after the fourth embodiment of the present invention, there shall be explained an optical information recording and reproducing apparatus wherein the offset of the displaced information signal at the time of recording can be eliminated and the focus servo can be positively pulled in.

Figure 11:
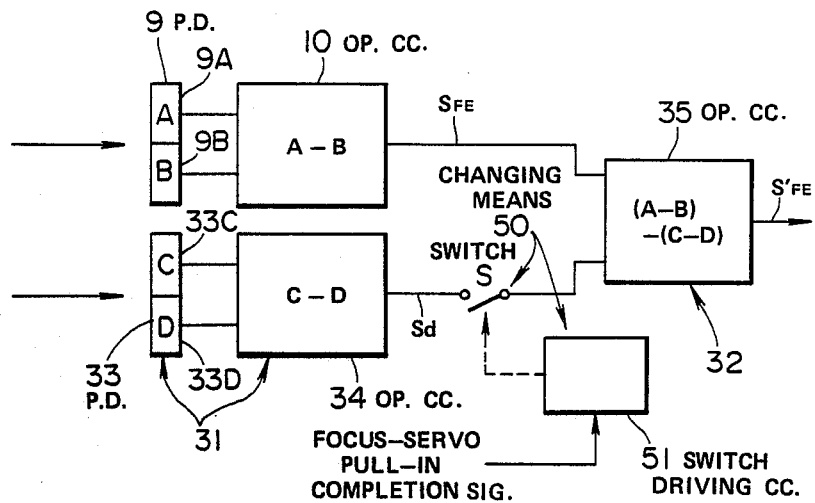
FIGS. 11 to 14 relate to the fourth embodiment of the present invention.
Figure 12:
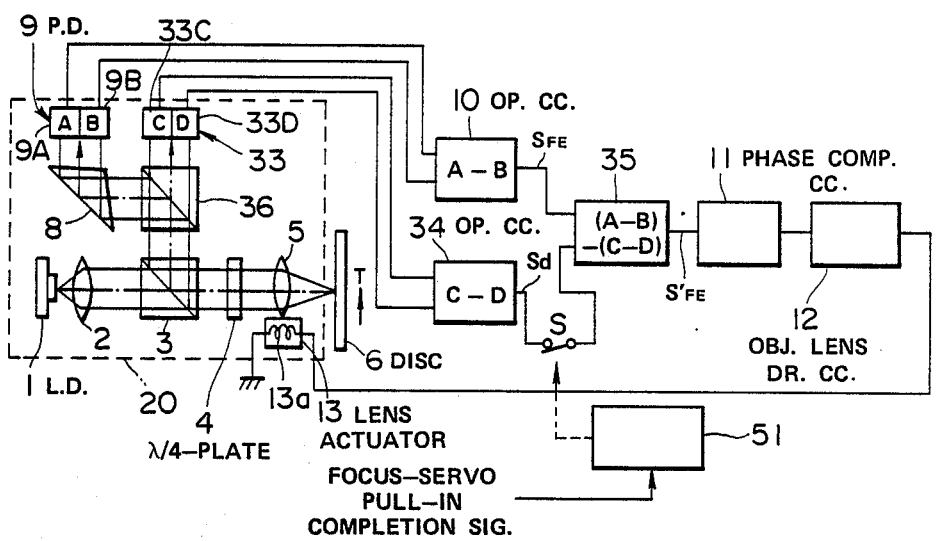

In the schematic diagram in FIG. 11, a changing means 50 changing the two states of a state of operating the offset eliminating means 32, for example, in response to the state of pulling in the focus and a state of not operating it over to each other is provided in the embodiment shown in FIG. 4.

As described with reference to FIG. 4, the above mentioned offset eliminating means 32 comprises, for example, the operational circuit 35 operating the difference signal $S_{FE}-Sd=(A-B)-(C-D)$ between the above mentioned focusing error signal $S_{FE}$ and beam distribution signal Sd and outputs the above mentioned difference signal $S_{FE}-Sd$ as a focusing error signal $S'_{FE}$ having had the offset eliminated.

The above mentioned changing means 50 is formed, for example, of a switch S interposed between the above mentioned operational circuits 34 and 35 and a switch driving circuit 51 driving this switch S. Until the focus servo pull-in is completed, the above mentioned switch S will be kept opened and (A−B) will become a focusing error signal and, after the focus servo pull-in is comleted, for example, in response to the focus servo pull-in completion signal input into the above mentioned switch driving circuit 51, the above mentioned switch S will be kept closed and (A−B)−(C−D) will become a focusing error signal.

In the optical information recording and reproducing apparatus of the fourth embodiment shown in FIG. 10, the switch S is provided between the output end of the operational circuit 34 and the operational circuit 35 in the apparatus shown in FIG. 5 and this switch is controlled to be opened and closed by the switch driving circuit 51. When the focus servo pull-in completion signal is input, this switch driving circuit 51 will output a switch driving signal closing the above mentioned switch S. At the time of the focus search leading the objective lens 5 into the focus servo pull-in range, the above mentioned switch driving circuit 51 will keep the above mentioned switch S opened until the focus servo pull-in is completed but will keep the above mentioned switch S closed in response to the focus servo pull-in completion signal after the focus pull-in is completed. Therefore, until the focus servo pull-in is completed, the focusing error signal $S_{FE}$ will be output out of the above mentioned operational circuit 35 but, on the other hand, after the focus servo pull-in is completed, the focusing error signal $S'_{FE}=S_{FE}-Sd$ having had the offset eliminated will be output.

Figure 13:
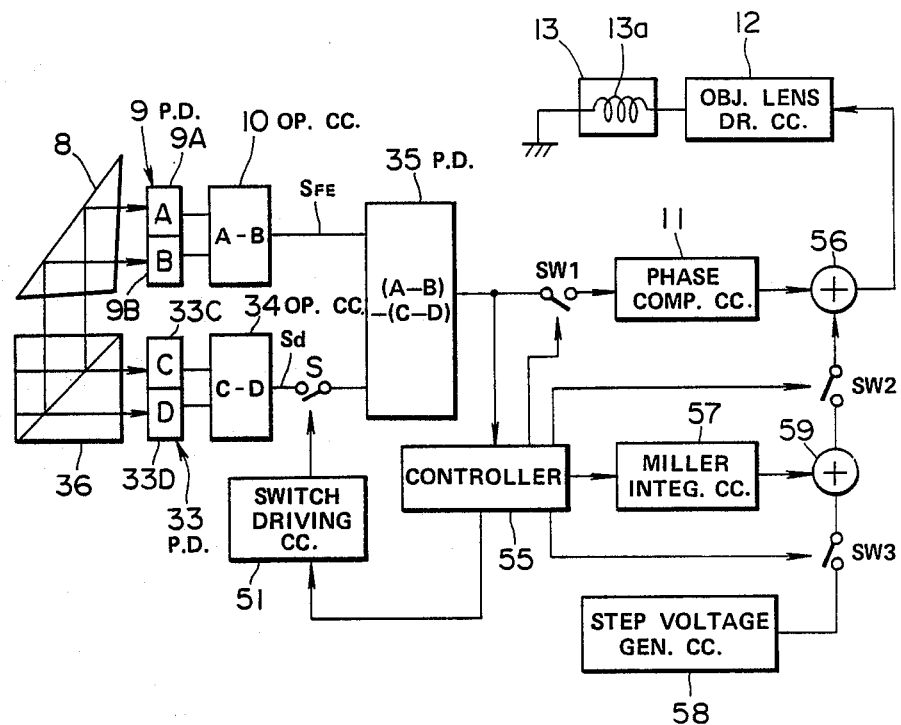

Now, the formation of the focus search system is shown in FIG. 13.

That is to say, the focusing error signal $S_{FE}$ (at the time of the focus search, until the focus servo pull-in is completed, the switch S will remain opened and therefore the offset will not be eliminated) from the operational circuit 35 is input, a controller 55 for judging the waveform of this focusing error signal is provided, a switch SW1 opening and closing a focus servo loop is interposed between the above mentioned operational circuit 35 and phase compensating circuit 11 and an adder 56 is interposed between the above mentioned phase compensating circuit 11 and objective lens driving circuit 12. The output of a Miller integrating circuit 57 and step voltage generating circuit 58 is input into the above mentioned adder 56 at the other input end. By the way, switches SW2 and SW3 are interposed respectively between the above mentioned adders 56 and 59 and between the adder 59 and step voltage generating circuit 58. The above mentioned controller 55 is to control the switch driving circuit 51, Miller integrating circuit 57 and switches SW1, SW2 and SW3.

Figure 14:
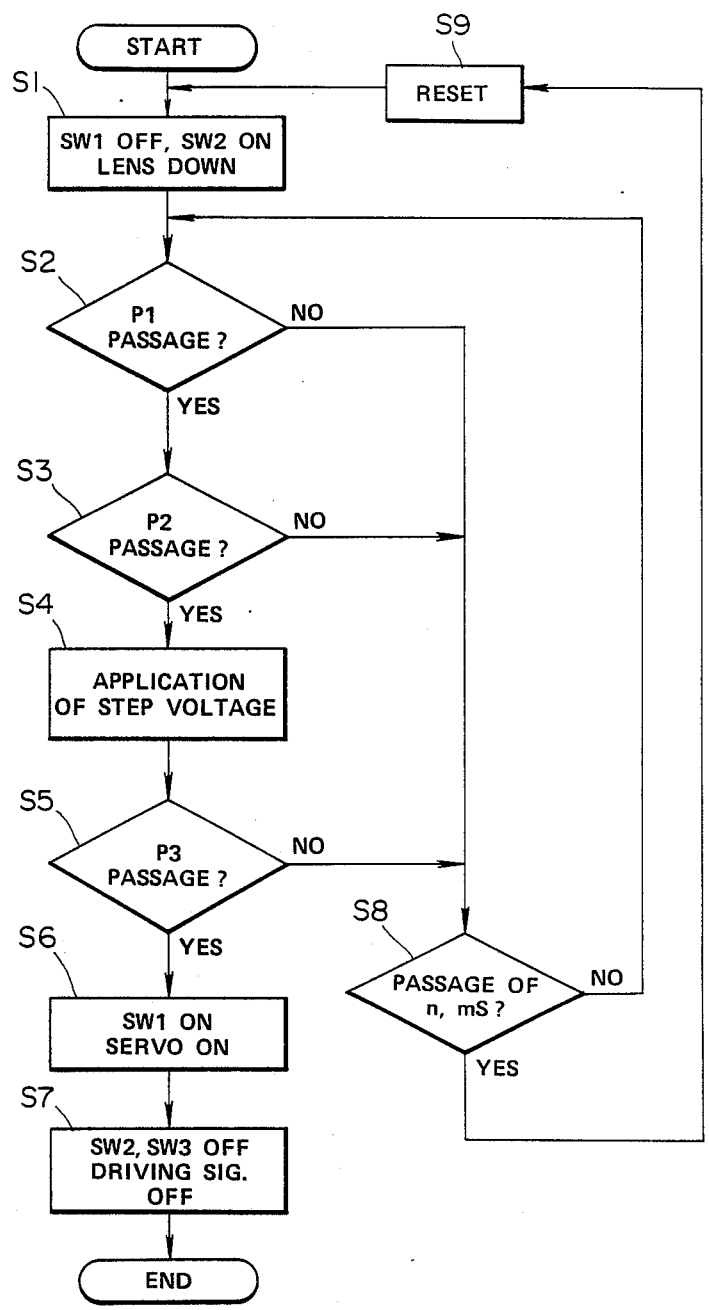

The operation of this focus search system shall be explained with reference to FIGS. 14 and 15.

Figure 15:
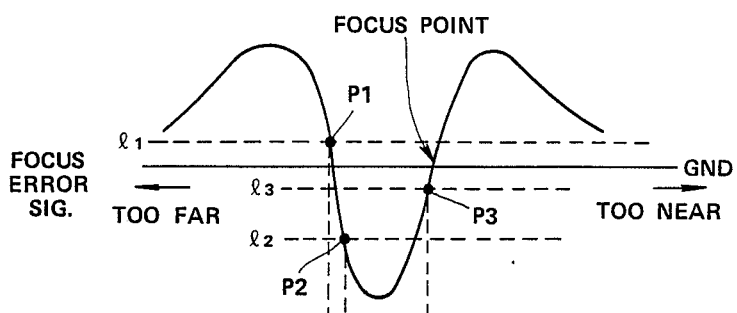
FIG. 15 is a waveform diagram for explaining the operation of the focus searching system.

First of all, in the step (which shall be mentioned as S1 hereinafter) 1 in FIG. 14, as shown in FIG. 15 (g), if an instruction (L level) of "Autofocus On (AFS ON)" is given to the Miller Integrating circuit 57 by the controller 55, the output (named a driving signal) of the Miller integrating circuit 57 will be applied to the objective lens circuit 12 through the adder 59, switch SW2 and adder 56 and the objective lens 5 will be moved to the farthest end of the actuator movable range ("Lens Down"). At this time, the switch SW2 will be closed to add the driving signal to the objective lens driving circuit 12 through the adder 56 and the switch SW1 will be opened to open the servo loop. The switch S will be opened so that the offset Sd may not be eliminated from the focusing error signal $S_{FE}$.

Together with "AFS ON", as shown in FIG. 15(h), "Search On (SRCH ON)" will also become "L". By this "SRCH ON", as shown in FIG. 15(f), the output of the above mentioned Miller integrating circuit 57 will decrease at a fixed gradient. By the output of this Miller integrating circuit 57, the objective lens 5 will be made to approach the disc 6 at a fixed velocity.

Then, in S2, as shown in FIG. 15(a) and (b), the passage of the focusing error signal through the point of P1 is confirmed by the change of the focusing error signal "Level High (FES LVH)" detecting the detecting level 11 to "L".

Further, in S3, as shown in FIG. 15(a), when the above mentioned focusing error signal passes through the point of P2, as shown in FIG. 15(c), "TOO FAR" detecting the detecting level 12 will change to "L", as shown in FIG. 15(h), "SRCH ON" will become "H" and, as shown in FIG. 15(f), the variation of the above mentioned driving signal will be stopped.

Then, in S4, "H" of the above mentioned "SRCH ON" will be received, as shown in FIG. 15(i), the switch SW3 will be closed with "L" of "DC ADD", as shown in FIG. 15(f), the step voltage generated by the step voltage generating circuit 58 will be added to the above mentioned driving signal through the adder 59 and the objective lens 5 will be forcibly made to approach the in-focus point.

As a result, the objective lens 5 will be made to quickly approach the in-focus point and, as shown in FIG. 15(a), the focusing error signal will pass through the point of P3. In S5, as shown in FIG. 15(d), this passage through p3 will be confirmed by the return to "L" of the focusing error signal "Level Low (FES LVL)" detecting the detecting level 13.

In S6, at the timing that the above mentioned "FES LVL" becomes "L", as shown in FIG. 15(e), "Focus Servo ON(F SRV ON)" will become "L", thereby the SW1 will be closed and the servo loop will be closed.

Then, in S7, as shown in FIG. 15(i), at the timing delayed by a predetermined time from "L" of the above mentioned "F SRV ON", "DC ADD" will be made "H", the switch SW3 will be opened and the application of the step voltage of the step voltage generating circuit 58 will be stopped. At the same time, as shown in FIG. 15(g), "AFS ON" will also return to "H", the switch SW2 will open, the output of the Miller integrating circuit 57 will be also interrupted, as shown in FIG. 15(f), the application of the driving signal will be stopped and the ordinary forcus servo will be made.

The operation after the above mentioned servo loop is closed will be the same as in the first embodiment explained with reference to FIG. 6 and the focusing error signal $S'_{FE}$ output from the operating circuit 35 will have the offset produced by the non-uniformity of the beam distribution in the tangential direction of the reflected light from the disc 6 eliminated as shown in FIG. 6(d).

By the way, for the focus servo pull-in completion signal output to the switch driving circuit 51, there may be used the fall of the above mentioned "F SRV ON" to "L", the output obtained by triggering a monomultivibrator in the fall of the above mentioned "F SRV ON" to "L" and delayed for a predetermined time by this monomultivibrator, the fall of "FES LVL" or the rise of "TOO FAR".

By the way, in such search process state as in the above, when the focusing error signal has not passed through the respective levels of P1, P2 and P3, if a predetermined delay time n ms is not reached in S8, the judgment will be repeated and, when the above mentioned delay time n ms has elapsed, the signal will be reset in S9 to return to the initial state.

Thus, according to this embodiment, the offset of the focusing error signal produced by the non-uniformity of the beam distribution in the tangential direction of the reflected light from the disc 6 at the time of recording can be eliminated, therefore the respective optimum focusing points in the reproducing state R and recording state W coincide with each other and the optimum focusing control can be made in both states.

Further, at the time of the focus search, until the focus servo pull-in is completed, the switch S will be kept opened, the difference signal (A−B) between the light receiving devices 9A and 9B will be the focusing error signal and therefore it will be able to be avoided that the waveform of the focusing error signal will be distorted by the value of the difference signal (C−D) between the light receiving devices 33C and 33D for detecting the beam distribution and the servo state will be unstable. Also, even if the assembling position error of the optical system and the position adjusting error of the light receiving devices 33C and 33D for detecting the beam distribution are in the conventional degree, that is, are not eliminated at all, the focus servo will be able to be positively pulled in.

Also, according to this embodiment, even if the diffraction pattern in the far field position of the reflected light from the disc 6 varies, for example, in each disc, the diffraction patterns on the aboe mentioned light detectors 9 and 33 will vary in the same manner and therefore the optimum focusing controll will be able to be always made.

By the way, between the preformat part and data part, as the incident beam is changed, the servo gain will be changed. If the change of this servo gain is imperfect, the offset of the focusing error signal will vary and the focusing error signal will be swung. According to this embodiment, as the above mentioned offset is eliminated, the swing of the focusing error signal between the preformat part and data part can be eliminated.

In this embodiment, the switch S may be manually opened and closed.

Figure 16:
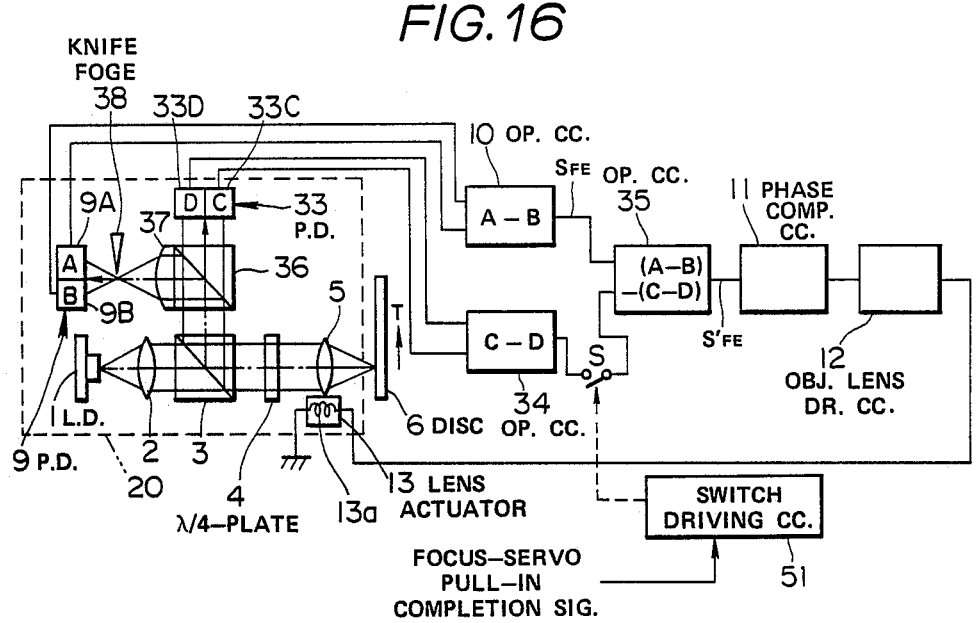
FIG. 16 is an explanatory diagram showing the formation of an optical information recording and reproducing apparatus of the fifth embodiment of the present invention.

FIG. 16 is an explanatory diagram showing the formation of an optical information recording and reproducing apparatus of the fifth embodiment of the present invention.

In this embodiment, the present invention is applied to a focusing error signal detecting system using a knife-edge method.

In this embodiment, one light bundle reflected by the half prism 36 is to be condensed by the condenser lens 37. A knife-edge (wedge-like light intercepting plate) 38 is arranged near the focus position of this condenser lens 37 and the light detector 9 is arranged in the position of receiving the diffracted light of the far field in the light bundle partly intercepted by this knife-edge 38. The difference signal A−B between the outputs A and B of the light receiving devices 9A and 9B of the above mentioned light detector is operated by the operational circuit 10 and is made a focusing error signal $S_{FE}$.

The other light bundle having passed through the above mentioned half prism 36 is received by the light detector 33 as a beam distribution detecting means the same as in the above mentioned fourth embodiment.

By the way, the light receiving device 9A and 9B of the above mentioned light detector 9 and the light receiving devices 33A and 33B of the light detector 33 are so arranged that the polarities of the focusing error signal $S_{FE}$ and the beam distribution signal Sd may coincide with each other for the beam distribution in the tangential direction of the reflected light from the disc 6.

The other formations, operations and effects are the same as in the fourth embodiment of the present invention.

Figure 17:
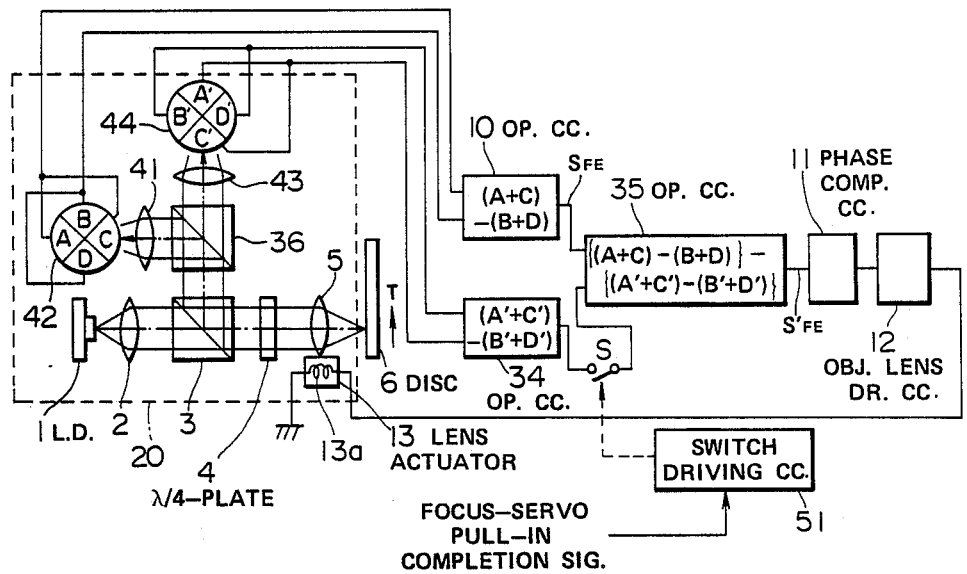
FIG. 17 is an explanatory diagram showing the formation of an optical information recording and reproducing apparatus of the sixth embodiment of the present invention.

FIG. 17 is an explanatory diagram showing the formation of an optical information recording and reproducing apparatus of the sixth embodiment of the present invention.

In this embodiment, the present invention is applied to a focusing error signal detecting system using an astignatic method.

In this embodiment, a cylindrical lens 14 is arranged in the light path of one light bundle reflected by the half prism 36. A four-divided light detector 42 is arranged in the position wherein the light bundle astignated by this cylindircal lens 41 becomes a true circle in the focused state. The focusing error signal $S_{FE}$ is to be obtained by taking the sums (A+C) and (B+D) of the outputs of the diagonal devices of the above mentioned light detector 42 and then operating the difference signal (A+C)−(B+D) by the operational circuit 10.

On the other hand, a cylindrical lens 43 is arranged in the light path of the other light bundle having passed through the above mentioned half prism 36. A four-divided light detector 44 is arranged in the position wherein the light bundle astignated by this cylindrical lens 43 becomes a true circle in the focused state. The beam distribution signal Sd is to be obtained by taking the sums (A'+C') and (B'+D') of the outpurs of the diagonal devices of this light detector 44 and then operating the difference signal (A'+C')−(B'+D') by the operational circuit 34.

By the way, the respective light receiving devices of the above mentioned light detectors 42 and 44 are so arranged that the polarities of the focusing error signal $S_{FE}$ and beam distribution signal Sd may coincide with each other for the beam distribution in the tangential direction of the reflected light from disc 6.

The other formations, operations and effects are the same as in the fourth embodiment.

By the way, the present invention is not limited to the above mentioned respective embodiments. For example, in the fourth and fifth embodiments, the difference signals A−C and B−D are operated and then the difference signal (A−C)−(B−D) between them is further operated and may be made a focusing error signal $S'_{FE}$ having had the offset eliminated. In such case, the changing means for changing the two states of operating an offset eliminating means and not operating it over to each other may be switches provided respectively between the respective operational circuits operating the difference signals A−C and B−D and between the light receiving devices 33C and 33D.

Also, a means of adjusting the gains of the focusing error signal $S_{FE}$ and beam distribution signal Sd may be provided to positively eliminate the offset.

By the way, the present invention can be applied also to the case of eliminating the offset of the focusing error signal or tracking error signal by any other system than of the above mentioned embodiments.

The formation and operation of the focus searching system are not limited to those shown in the fourth embodiment. For example, the objective lens 5 may be moved to the nearest end of the actuator range and then made to gradually approach the disc 6 to be led into the focus servo pull-in range.

The present invention is not limited to the recording form of forming pits but can be applied also to varying the reflecting rate or passing rate by a phase shift or the like.

Further, the present invention is not limited to the rotated and driven disc but can be applied also to the case of writing into a card-like recording medium.

As explained above, according to the fourth to seventh embodiments, there are effects that, as the beam distribution detecting means detecting the beam distribution in the tangential direction of the light returning from the recording medium and the offset eliminating means eliminating the offset of the displaced information signal by the beam distribution signal detected by this beam distribution detecting means are provided, the offset of the displaced information signal at the time of recording can be eliminated and, as the changing means changing the two states of operating the above mentioned offset eliminating means and not operating it over to each other is provided, the focus servo can be positively pulled in.

By the way, the present invention is not limited to the application to the disc-like recording medium having the recording track formed to be concentrically circular or spiral but can be applied to a card-like recording medium having the recording track formed to be like parallel lines.

Also, the above mentioned changing means may be controlled to eliminate the offset only at the time of recording/eliminating the focusing error signal.

The above mentioned changing means may be controlled the same as in the case of the above mentioned focusing error signal also for the tracking error signal.

What is claimed is:

1. An optical information recording and reproducing apparatus, comprising:
    a light source means for generating a light beam for recording or reproducing;
    an optical means for condensing and radiating the light of said light source means onto an optical recording medium arranged in a far field position;
    a controlling signal producing means for receiving the light returning from said recording medium and producing a focusing controlling signal or tracking controlling signal;
    an actuator means for setting said optical means in a focusing state or tracking state by the application of said controlling signal;
    a beam distribution detecting means for receiving the light returning from said recording medium and detecting the beam distribution in the tangential direction of the track of said recording medium, and wherein said beam distribution detecting means is for detecting an offset based on a physical change of a surface of said recording medium; and
    an offset eliminating means for eliminating the offset in said focusing controlling signal or tracking controlling signal with the beam distribution signal detected by said beam distribution detecting means.

2. An optical information recording and reproducing apparatus, comprising:
    an optical means for condensing and radiating the light of said light source onto an optical recording medium arranged in a far field position;
    a controlling signal producing means for receiving the light returning from said recording medium and producing a focusing controlling signal or tracking controlling signal;
    an actuator means for setting said optical means in a focusing state or tracking state by the application of said controlling signal;
    a beam distribution detecting means for receiving the light returning from said recording medium and detecting the beam distribution in the tangential direction of the track of said recording medium, and wherein said beam distribution detecting means is for detecting an offset based on a physical change of a surface of said recording medium;
    an offset eliminating means for eliminating the offset in said focusing controlling signal or tracking controlling signal with the beam distribution detecting means; and
    a change controlling means for changing the states of operating and non-operating said offset eliminating means over to each other.

3. An optical information recording and reproducing apparatus according to claim 1 or 2, wherein said beam distribution detecting means comprises a light receiving means for receiving the light beam in the tangential direction of the track of said recording medium in the light returning from said recording medium and an operational circuit operating the output signal of said light receiving means.

4. An optical information recording and reproducing apparatus according to claim 3, wherein said light receiving means comprises at least two equal light receiving devices for receiving the light beam in the tangential direction of said track.

5. An optical information recording and reproducing apparatus according to claim 1, wherein said operational circuit is formed of a subtractor.

6. An optical information receiving and reproducing apparatus according to claims 3, wherein said light receiving means is for receiving a part of the light beam obtained by branching with a beam splitter of the light beam which is led to a controlling signal for producing light detecting means for producing said focusing controlling signal or tracking controlling signal.

7. An optical information recording and reproducing apparatus according to claim 6, wherein said light receiving means is for receiving a part of the light beam led to a critical angle prism side for producing the focusing controlling signal.

8. An optical information recording and reproducing apparatus according to claim 6, wherein said light receiving means is for receiving a part of the light beam led to a focusing controlling signal for producing light detecting means in a knife-edge manner.

9. An optical information recording and reproducing apparatus according to claim 6, wherein said light receiving means is for receiving a part of the light beam led to a controlling signal for producing light detecting means by an astigmatic method.

10. An optical information recording and reproducing apparatus according to claim 1 wherein said offset eliminating means is formed of an operational circuit for operating said focusing controlling signal or tracking controlling signal and said beam distribution signal.

11. An optical information recording and reproducing apparatus according to claim 10, wherein said operational circuit is formed of a subtractor.

12. An optical information recording and reproducing apparatus according to claim 2, wherein said change controlling means is for outputting an operation instructing signal for operating said offset eliminating means at the recording/eliminating mode time.

13. An optical information recording and reproducing apparatus according to claims 2, wherein said change controlling means is for outputting an operation instructing signal which operates said offset eliminating means at least when the focus servo terminates.

14. An optical information recording and reproducing apparatus according to claim 1, wherein said light amount distribution detecting means comprises a first light detecting means for receiving a light through an optical device and detecting at least a light amount distribution of the tangential direction and focusing error signals, and a second light detecting means for detecting a light beam in the location prevented from passing the optical device and the light distribution of the tangential direction, wherein the optical device changes the distribution of the passing light beam relative to the amount of focusing error.

* * * * *

UNITED STATES PATENT AND TRADEMARK OFFICE
CERTIFICATE OF CORRECTION

PATENT NO. : 4,819,220
DATED : April 4, 1989
INVENTOR(S) : Yasuhiro MIYAZAKI et al It is certified that error appears in the above-identified patent and that said Letters Patent is hereby corrected as shown below:

On the cover page, Item [75], "Tasuhiro Miyazaki" should read --Yasuhiro Miyazaki--.

Signed and Sealed this

Twenty-third Day of January, 1990

*Attest:*

JEFFREY M. SAMUELS

*Attesting Officer*     *Acting Commissioner of Patents and Trademarks*